(12) United States Patent
Burugupalli et al.

(10) Patent No.: US 10,966,053 B2
(45) Date of Patent: *Mar. 30, 2021

(54) RANGING PRIORITY INDICATION

(71) Applicant: Apple Inc., Cupertino, CA (US)

(72) Inventors: Srinivas Burugupalli, Union City, CA (US); Qi Wang, Sunnyvale, CA (US); Oren Shani, Saratoga, CA (US); Christiaan A. Hartman, San Jose, CA (US); Danlin Li, San Jose, CA (US); Aniruddha S. Diwan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,171

(22) Filed: Dec. 31, 2019

(65) Prior Publication Data

US 2020/0137518 A1  Apr. 30, 2020

Related U.S. Application Data

(63) Continuation of application No. 16/155,464, filed on Oct. 9, 2018, now Pat. No. 10,555,119.

(60) Provisional application No. 62/694,654, filed on Jul. 6, 2018.

(51) Int. Cl.
*H04W 4/02* (2018.01)
*G01S 13/76* (2006.01)

(52) U.S. Cl.
CPC ........... *H04W 4/023* (2013.01); *G01S 13/765* (2013.01)

(58) Field of Classification Search
CPC ............................. H04W 4/023; G01S 13/765
USPC ....................................................... 455/456.1
See application file for complete search history.

(56) References Cited

U.S. PATENT DOCUMENTS

| 8,724,566 | B2 | 5/2014 | Cho |
|---|---|---|---|
| 9,763,275 | B2 | 9/2017 | Park |
| 10,555,119 | B2 * | 2/2020 | Burugupalli .......... H04W 4/023 |
| 2007/0202882 | A1 | 1/2007 | Lee |
| 2008/0304560 | A1 | 12/2008 | Aoyagi |
| 2010/0195492 | A1 | 8/2010 | Harmatos |
| 2010/0248771 | A1 * | 9/2010 | Brewer ................. H04W 72/10 455/518 |
| 2012/0063305 | A1 * | 3/2012 | Chiu ................. H04W 74/0833 370/230 |
| 2014/0051379 | A1 | 2/2014 | Ganesh |
| 2015/0133049 | A1 | 5/2015 | Lee |
| 2017/0188205 | A1 | 6/2017 | Ventura Jaume |
| 2017/0230939 | A1 | 8/2017 | Rudolf |
| 2017/0251330 | A1 | 8/2017 | Won |
| 2017/0353981 | A1 * | 12/2017 | Lee ........................ H04W 76/10 |
| 2018/0107881 | A1 * | 4/2018 | Datta ..................... G16B 40/00 |
| 2020/0335113 | A1 * | 10/2020 | Kim ....................... G10L 19/008 |

\* cited by examiner

*Primary Examiner* — Inder P Mehra
(74) *Attorney, Agent, or Firm* — Kowert, Hood, Munyon, Rankin & Goetzel, P.C.

(57) ABSTRACT

This disclosure relates to techniques for performing ranging wireless communication including prioritization. A first wireless device may transmit a request for ranging services to a second wireless device. The first wireless device may transmit an indication of a ranging priority to the second wireless device. The second wireless device may determine a granted ranging priority. The first and second wireless device may perform ranging communication according to the granted ranging priority.

20 Claims, 5 Drawing Sheets

| Ranging Priority | Designation | Sample Use Case |
|---|---|---|
| 0 | Critical (C) | Emergency call indoors |
| 1 | High (H) | Battery critical device loss |
| 2 | Best Effort (BE) | Locate a commercial outlet |
| 3 | Background (BK) | Logging, Building location databases |

FIG. 6

| Ranging Priority | Designation |
|---|---|
| 0 | Critical (C) High time sensitivity |
| 1 | Non Critical (NC): Low time sensitivity |

FIG. 7

RANGING PRIORITY INDICATION

PRIORITY CLAIM

This application is a continuation of U.S. patent application Ser. No. 16/155,464, entitled "Ranging Priority Information," filed Oct. 9, 2018, which claims priority to U.S. provisional patent application Ser. No. 62/694,654, entitled "Ranging Priority Information," filed Jul. 6, 2018, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for performing ranging wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes ranging communication. Ranging can provide the distance between one wireless device and another. However, existing wireless communication technologies may not provide a means to prioritize between ranging requests (e.g., of various devices). Accordingly, improvements in the field are desired.

SUMMARY

Embodiments are presented herein of, inter alfa, systems, apparatuses, and methods for wireless devices performing ranging sessions.

According to the techniques described herein, wireless ranging sessions/measurements may be performed in a manner that prioritizes ranging requests according to the needs of a device initiating the ranging request and provides a mechanism for reducing (e.g., unnecessary) ranging sessions that may not satisfy the needs of the initiating device, at least according to some embodiments. Thus, these techniques may improve performance of ranging and reduce over the air traffic and medium congestion.

The techniques described herein may be implemented in and/or used with a number of different types of devices, including but not limited to cellular phones, tablet computers, accessory and/or wearable computing devices, portable media players, vehicles, access points and other wireless local area network equipment, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6 and 7 are tables illustrating potential example ranging priority indication schemes, according to some embodiments.

Figure 1:
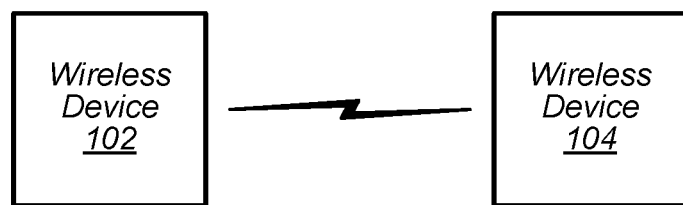
FIG. 1 illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device. A communication device may be referred to as a station or STA.

Base Station or Access Point (AP)—The term "Base Station" has the full breadth of its ordinary meaning, and at least includes a wireless communication station installed at a fixed location and used to communicate as part of a wireless telephone system or radio system. The term "access point" is used similarly.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network. Wi-Fi or WLAN may refer to technology based on IEEE 802.11 wireless standards such as 802.11a, 802.11.b, 802.11g, 802.11n, 802.11-2012, 802.11ac, 802.11ad, 802.11ax, 802.11ay, 802.11az, and/or other IEEE 802.11 standards.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Acronyms

FTM: Fine Timing Measurement
HE: High Efficiency
HEz: High efficiency ranging for 802.11az
VHT: Very High Throughput
VHTz: VHT ranging for 802.11az
iSTA: Initiating STA
rSTA: Responding STA
NGP: Next generation positioning FIG. 1—Wireless Communication System FIG. 1 illustrates an exemplary (and simplified) wireless communication system in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, handheld device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1. For example, the wireless devices 102 and/or 104 may perform one or more ranging wireless communication techniques or features described subsequently herein with respect to the Figures. By utilizing such techniques (and/or other techniques described herein), the wireless device(s) may (at least according to some embodiments) be able to achieve prioritized ranging communication. The wireless devices 102 and/or 104 may be referred to as STAs.

Figure 2:
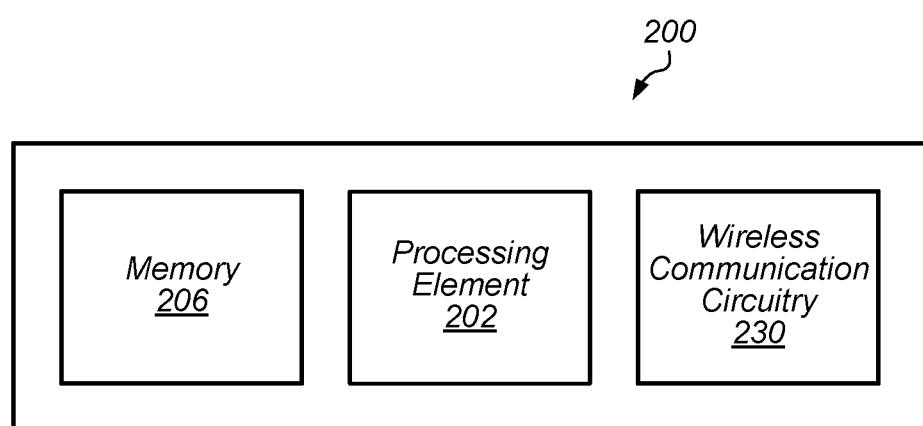
FIGS. 2 and 3 are block diagrams illustrating example wireless devices, according to some embodiments.
Figure 3:
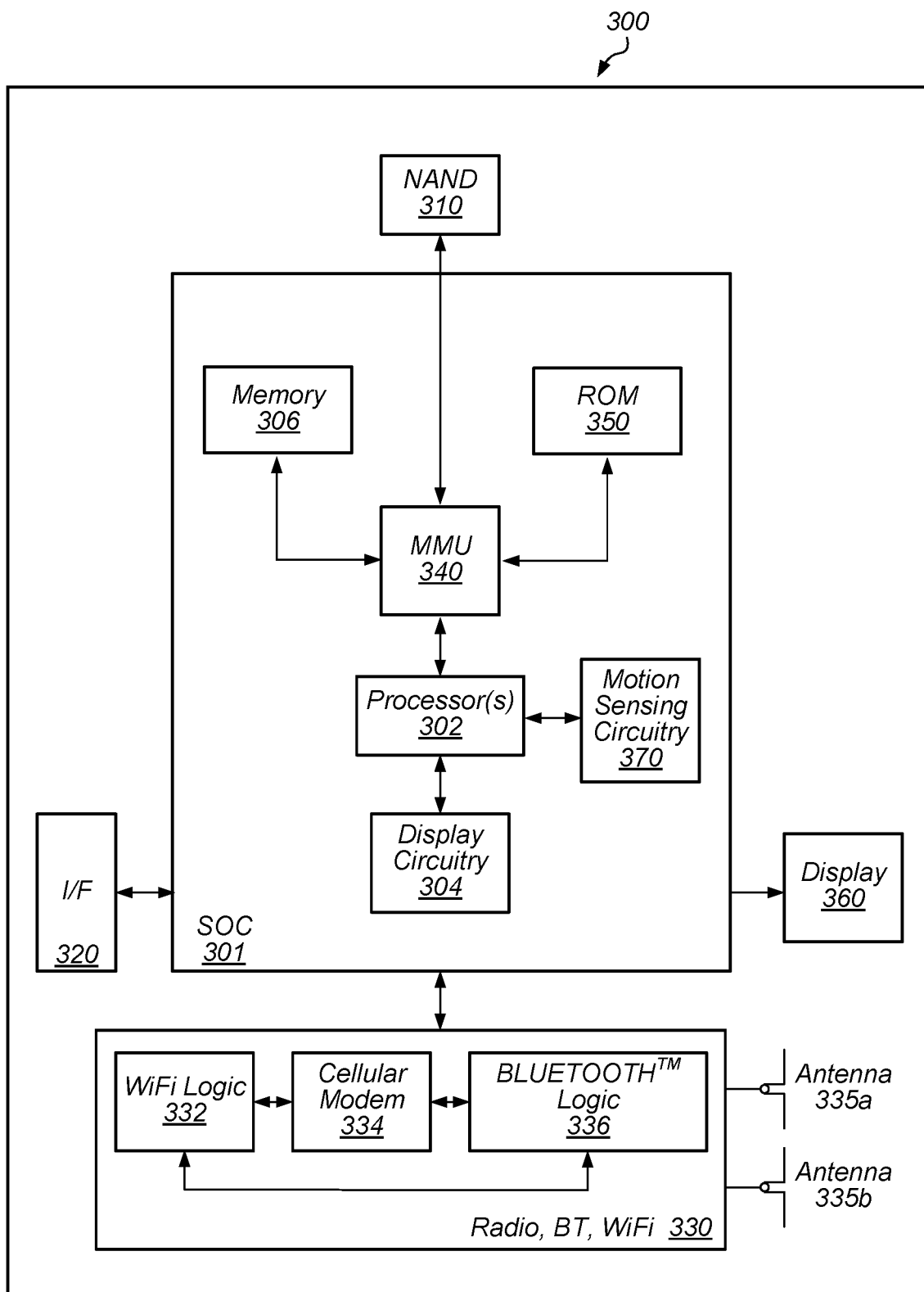

FIGS. 2-3—Exemplary Device Block Diagrams

FIG. 2 illustrates an exemplary wireless device 200 (e.g., corresponding to wireless devices 102 and/or 104) that may be configured for use in conjunction with various aspects of the present disclosure. The device 200 may be any of a variety of types of device and may be configured to perform any of a variety of types of functionality. The device 200 may be a substantially portable device (e.g., smart phone or accessory device, among various possibilities) or may be a substantially stationary device, potentially including any of a variety of types of device (e.g., an access point or base station, among various possibilities). The device 200 may be configured to perform one or more ranging wireless communication techniques or features, such as any of the techniques or features illustrated and/or described subsequently herein with respect to any or all of the Figures.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor), e.g., in addition to the processing element 202. For example, the processing element 202 might be an 'application processor' whose primary function may be to support application layer operations in the device 200, while the wireless communication circuitry 230 might be a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The wireless device 300 may include at least one antenna, and in some embodiments multiple antennas 335a and 335b, for performing wireless communication with base stations and/or other devices. For example, the wireless device 300 may use antennas 335a and 335b to perform the wireless communication. As noted above, the wireless device 300 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the wireless device 300 to perform Wi-Fi communications, e.g., on an 802.11 network. The Bluetooth Logic 336 is for enabling the wireless device 300 to perform Bluetooth communications. The cellular modem 334 may be capable of performing cellular communication according to one or more cellular communication technologies. Some or all components of the wireless communication circuitry 330 may be used for ranging communications, e.g., using WLAN, Bluetooth, and/or cellular communications.

As described herein, wireless device 300 may include hardware and software components for implementing embodiments of this disclosure. For example, one or more components of the wireless communication circuitry 330 (e.g., Wi-Fi Logic 332) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Wireless Ranging

Two wireless devices may engage in a ranging operation so that at least one of the wireless devices will be able to determine or estimate the range (e.g., distance) between the two devices, e.g., by measuring the amount of time that it takes to send messages between the devices. For example, the Fine Timing Measurement (FTM) protocol specified in 802.11-2016 may provide a time-of-flight based mechanism to perform ranging between two 802.11/WiFi devices, according to some embodiments. In FTM, range may be determined as a function of several time instances (t1, t2, t3 and t4), where t1, t2, t3, and t4 correspond to the time of departure and time of arrival of measurement frames sent in both directions (e.g., uplink and downlink) between the two devices (e.g., the two STAs). Standards under development (e.g., 802.11az) may aim to improve and/or optimize the ranging protocols for a variety of use cases, including very high throughput (VHT), high efficiency (HE), and/or 60 GHz communications, among others. Further, improvements to scalability and security may be desired.

In some embodiments, the ranging protocol (e.g., within 802.11az) may include a common negotiation phase that may precede a ranging measurement phase of various ranging modes and/or packet sequences (e.g., FTM, High efficiency ranging for 802.11az (HEz), or VHT ranging for 802.11az (VHTz); it should be noted that these may be working names for various ranging modes, that these names may change, and that other ranging modes may be used). In the negotiation phase, an initiating STA (iSTA) may send an initial measurement request frame (e.g., an FTM measurement request frame, e.g., a negotiation frame). The measurement request frame may include a set of ranging parameters. For example, the measurement request frame may include scheduling parameters in one or more FTM parameters element or a set of range measurement parameter elements in a next generation positioning (NGP) parameters element, etc. The ranging parameters may describe the bandwidth or bandwidths available for ranging, the bandwidth measured by the iSTA, radio frequency (RF) related parameters, one or more modes of ranging supported by the iSTA, and/or ranging security requirements, among other possibilities. The frame contents may describe the iSTA's capability and availability for ranging measurement exchange.

A responding STA (rSTA) may send an acknowledgement (ACK) for the measurement request frame. The rSTA may also send a response frame (e.g., a first FTM measurement frame). In some embodiments, the measurement frame may be sent within milliseconds, e.g., 10 ms, of receiving the initial measurement request frame. Note that other response times or time delays are possible (e.g., 5 ms, 15 ms, tens of milliseconds, hundreds of milliseconds, etc.). In some embodiments, the measurement frame may include a set of ranging parameters to describe the rSTA's capability and schedule (e.g., availability) for ranging measurement exchange. The measurement frame may indicate the rSTA's choices of parameters, e.g., the parameters indicated in the measurement frame may be consistent with the parameters indicated within the measurement request frame. The selected parameters may be indicated in one or more FTM parameter elements, NGP parameter elements, etc.

In some embodiments, different iSTAs may have different requirements (or preferences, etc.) related to the timing of a ranging session, e.g., how quickly ranging is to be performed. For example, some iSTAs may be more sensitive to (e.g., may be more negatively impacted by) delays than other iSTAs. In other words, one TSTA (e.g., for any reason) may place a high priority on determining its range promptly, while another iSTA may not be adversely impacted by a delay. This ranging time sensitivity be referred to as "ranging priority" herein, although other terms may also be used. Some exemplary scenarios in which an iSTA may have a high ranging priority include, but are not limited to:

Emergency call location identification, e.g., in a highly populated area like a stadium;

Ranging and location information requirement if the battery of the iSTA is below a threshold (e.g., low or critically low, such as below 1%, 5%, 10%, etc. remaining battery power);

Real-time gaming scenarios; and/or

Locating lost devices (e.g., headphones or other accessory devices) where high priority is important due to a relatively small battery (e.g., of the accessory device).

Current standards (e.g., 802.11-2016 or current drafts of 802.11az) may not provide any means for supporting different ranging priorities. For example, current standards may not provide for any indication from an TSTA to an rSTA of ranging priority. Accordingly, an rSTA may not manage its resource allocation and schedule ranging activities according to the ranging priority of any iSTA(s).

Figure 4:
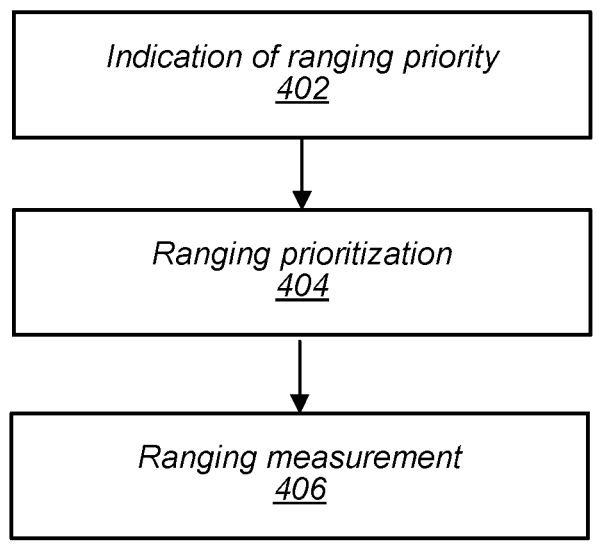
FIG. 4 is a flowchart diagram illustrating an exemplary method for performing ranging wireless communication, according to some embodiments.

FIG. 4—Exemplary Method for Performing Ranging Techniques

FIG. 4 is a flowchart diagram illustrating a method for performing ranging wireless communication incorporating ranging priority, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 4 may be implemented by a wireless device, such as the wireless devices 102, 104, 200, or 300 illustrated in and described with respect to FIGS. 1-3, or more generally in conjunction with any of the computer systems or devices shown in the Figures, among other devices, as desired. Note that while at least some elements of the method of FIG. 4 are described in a manner relating to the use of communication techniques and/or features associated with WLAN, such description is not intended to be limiting to the disclosure, and aspects of the method of FIG. 4 may be used in any suitable wireless communication system, as desired. Further, note that while at least some elements of the method of FIG. 4 are described in a manner relating to the use of communication techniques and/or features associated with measuring range/distance, these techniques can additionally or alternatively be applied to other types of measurements, such as measuring direction/angle, location, relative position, etc. In other words, these techniques may be applied to any of various spatial measurements. As shown, the method may operate as follows.

A first wireless device (e.g., an iSTA) may transmit an indication of a requested ranging (e.g., and/or direction or other spatial measurement) priority and a second wireless device (e.g., an rSTA) may receive the indication (402). The indication may be transmitted with one or more ranging parameters. Referring back to FIG. 1, the TSTA may be wireless device 102 and the rSTA may be wireless device 104, or vice versa. In some embodiments, the method of FIG. 4 may be implemented with larger numbers (e.g., three or more) wireless devices (e.g., multiple iSTAs and/or multiple rSTAs), as desired.

The iSTA may determine the ranging priority based on any factor or combination of factors. For example, the iSTA may consider any combination of the following exemplary factors, among various possibilities.

One possible factor may be one or more applications executing on the iSTA. For example, an emergency call may be associated with a high ranging priority. In contrast, an application for routine logging of location, e.g., to build/maintain a location data base may be associated with low ranging priority.

Another factor may be the status (e.g., upcoming traffic, etc.) of any applications executing on the device. For example, a real time game determining location of players may be associated with a high ranging priority; thus, the ranging priority may depend on the status of the game (e.g., location may not be needed at all times).

Another possible factor may be various settings or user preferences.

Another possible factor may be time. For example, time of day, day of week, and/or month of year may be considered. Additionally, or alternatively, the time since a last ranging session with one or more rSTAs (e.g., which may be the same or different than the rSTA to which the current indication is sent) may be considered.

Another possible factor may be location. For example, some locations with crowds, hazards, rapid transit, etc., may be associated with high ranging priority; similarly, proximity to exits of a building (e.g., in the case of theft deterrent devices) may also be associated with high ranging priority. Other locations may not be associated with high ranging priority. Location may be determined in any manner, e.g., based on a usual or last known location of the TSTA, etc.

Another possible factor may be motion. Motion of the iSTA may be determined based on changes/trends in past ranging measurements or based on data/measurements of other sensors or techniques such as motion sensors, global positioning system, detection of new/different wireless networks, etc. For example, a theft deterrent device that detects unexpected motion may be associated with high ranging priority. Similarly, motion of a device associated with the iSTA may be considered. For example, an iSTA that is paired with a companion device (such as an accessory device paired via Bluetooth, etc.) may consider motion of (or detected by) the companion device.

Another possible factor may be proximity to a user of the iSTA. For example, an accessory device such as a smart watch may determine a higher priority while being worn and a low priority while not being worn, e.g., or vice versa. Such priority may potentially further depend on other factors, such as whether or not a foreground application is executing on the accessory device, etc.

Another possible factor may be battery level/charge (e.g., limited battery life of the iSTA may be associated with high ranging priority). Similarly, battery level of an associated/companion device may be considered.

Another possible factor may be connection status (e.g., to any wireless networks according to any wireless technologies). For example, an additional network connection may provide alternative means of determining location, and thus may suggest lower ranging priority.

Another possible factor may be availability of other means of detecting position and/or motion. For example, availability of GPS, accelerometers, etc. may be associated with lower ranging priority, according to some embodiments.

Another possible factor may be identity of the device and/or user. For example, some or all devices of public safety personnel may be associated with high ranging priority.

Another possible factor may be status of other devices (e.g., based on knowledge of the position of the TSTA relative to other iSTAs).

Another possible factor may be communication capability of the iSTA.

Any factor or combination of the above factors may be considered, among various possibilities. Other factors may also be considered.

In some embodiments, the indication may occur during a ranging negotiation phase, such as in a measurement request frame, e.g., an initial FTM measurement request frame (e.g., negotiation frame) transmitted from an TSTA to an rSTA. The indication of ranging priority may be transmitted with a request for ranging services (e.g., a request for a ranging session) with the rSTA, or may be transmitted separately from such a request. However, the indication may be transmitted at any time, e.g., the indication may be indicated at any time that the iSTA determines its ranging priority, determines a change in ranging priority, determines any (e.g., other) ranging parameter, determines a change in any ranging parameter (e.g., an updated bandwidth), receives feedback (e.g., or any message) from the rSTA, etc.

In some embodiments, the indication of ranging priority may not be transmitted during ranging negotiation, e.g., it may be transmitted before or after ranging negotiation. For example, an iSTA may transmit a standing indication of ranging priority (e.g., that may last until changed), and may request ranging services (e.g., initiate ranging negotiation) separately (e.g., on a periodic or as needed basis). Alternatively, the indication may be transmitted after ranging negotiation, e.g., based on a change in ranging priority or in response to a query, e.g., from the rSTA.

The indication may be transmitted in any manner, e.g., the indication may be transmitted in any message (e.g., container) or combination of messages. For example, a container of such a ranging priority indication can be or include either a field, or a subfield of either a frame, an information element (IE), or an information sub-element. The indication may be transmitted in signaling associated with any layer. For example, the indication may be transmitted as (e.g., a component of) a media access control (MAC), logical link control (LLC), or physical (PHY) layer message. The indication may be or comprise a MAC service data unit (MSDU), MAC protocol data unit (MPDU), or an aggregated MPDU or aggregated MSDU. As used herein, the term "ranging priority field" may refer to any such container.

The indication may be transmitted in any format, e.g., in any number of bits or combination of bit fields. For example, the ranging priority may be two bits in duration and the values of the ranging priority may be set according to FIG. 6 (described below), where the ranging priority value of 0 indicates the highest time sensitivity and the ranging session should be executed as soon as possible, and a value of 3 indicates the lowest time sensitivity and is not time critical. Alternatively, the ranging priority may be one bit in duration (e.g., as shown in FIG. 7, described below), where the ranging priority value of 0 may indicate a high time sensitivity and the ranging session should be executed as soon as possible, and a value of 1 may indicate a low time sensitivity and is not time critical.

In some embodiments, the TSTA may indicate its ranging priority by specifying the time when the ranging session needs to be complete (e.g., or to start, or to reach any other milestone as desired). For example, a ranging priority value may be specified in accordance with the desired ranging completion time (e.g., 2 seconds, among various possibilities, e.g., based on any factor(s) used to determine ranging priority). For example, the indication may represent a difference measured from the time of the transmission of an initial measurement request (e.g., or of the indication of ranging priority) to the time of a successful transmission of a report containing the measurement result or of a first or last measurement frame associated with generating the measurements, etc.

In some embodiments, the iSTA may include multiple indications in the indication of ranging priority. For example, the indication may include both a level (e.g., high, medium, low, etc. priority, e.g., as in the examples of FIGS. 6 and 7) and a requested timing (e.g., completion within some number of seconds, etc.). The indication may alternatively, or additionally, include a reason/justification, e.g., the indication may include a ranging priority level and a basis for that prioritization (e.g., safety, theft, gaming, battery, etc.). The indication may alternatively, or additionally, include other information (e.g., about outstanding or ongoing ranging activities with other rSTAs, other activities of the TSTA, etc.).

In some embodiments, in response to a determination that the iSTA needs to update its ranging priority, it may terminate an existing ranging session (and/or ranging negotiation) and start a new ranging session/negotiation.

In some embodiments, an TSTA may indicate that it does not have (e.g., or does not know, or has no preferences for) its ranging priority by one or more of: setting the ranging priority indication (e.g., field) to a specific value (e.g., a value configured to mean the absence of a ranging priority indication), and/or omitting the ranging priority field from the container, e.g., a negotiation frame, e.g., FTM request frame.

The rSTA may determine how/if to implement the requested ranging (e.g., and/or direction or other spatial measurement) priority (404). In other words, the rSTA may determine an implemented/granted ranging priority. For any request for ranging services, the granted priority may be based at least in part on the requested ranging priority. Further, the granted ranging priority may be the same as the requested priority or it may be different. For example, the rSTA may consider factors including relevant policies or settings guiding its prioritization of ranging requests (e.g., relative to other ranging requests and/or to other activities). Similarly, the rSTA may consider the (e.g., requested and/or granted) ranging priority of other pending requests for ranging services and/or ongoing ranging sessions. It will be appreciated that although some qualitative descriptions (e.g., high, low, etc.) of ranging priority are used herein, quantitative values could also or alternatively be used. For example, on a scale of 1-10, a "high" ranging priority could be any priority of 7 or greater; a low priority may be 3 or less, etc. Note that these values are illustrative only.

In some embodiments, multiple rSTAs may coordinate (e.g., directly, or with assistance or instruction from another network device) to prioritize one or more ranging sessions associated with any ranging priority (priorities). For example, multiple rSTAs may cooperate to perform ranging sessions with various iSTAs (e.g., a theft deterrent system in a department store may coordinate ranging sessions between any number of iSTA and rSTA devices, e.g., so that ranges between the various devices are periodically monitored and refreshed).

The rSTA may prioritize one or more ranging requests according to the granted or indicated ranging priority (and/or additional or alternative factors) in any of various ways. In some embodiments, the rSTA may allocate resources to schedule ranging sessions according to the (e.g., granted) ranging priorities of one or more iSTAs, e.g., based on the relationships between the ranging priorities, e.g., based on comparing the granted ranging priority to at least one relative granted ranging priority of at least one other ranging measurement request. For example, a ranging request from an TSTA with a higher granted ranging priority may be scheduled earlier than the iSTAs with a lower priority. As another example, an rSTA may allocate its resource for its non-ranging activity (e.g., data service) and ranging activity according to the ranging priority indication from an iSTA. In other words, a high ranging priority ranging session may take precedence over some or all data traffic, while a low ranging priority ranging session may not (e.g., may wait until at least some data traffic has been served).

In some embodiments, an rSTA may reserve certain resources (e.g., in time and/or frequency) for serving high ranging priority ranging sessions and may allocate (e.g., schedule) these resources to such ranging sessions as needed. Low priority ranging sessions may be scheduled to other (e.g., non-reserved) resources. Further, such an rSTA may allocate the reserved resources to other uses (e.g., data and/or low priority ranging sessions) to the extent that resources are available after serving high priority ranging sessions. In some embodiments, an rSTA may interrupt (e.g., cancel and/or delay) one or more ongoing or upcoming transmissions (e.g., of data and/or ranging, e.g., in the uplink and/or downlink directions) in order to provide resources for a high ranging priority ranging session or sessions.

In some embodiments, to prioritize ranging requests, an rSTA may maintain (e.g., and periodically/continually update) a queue (e.g., ordered list) of ranging sessions/requests and may add, move, or delete ranging sessions/requests in the queue based on the ranging priority of the sessions/requests. For example, in response to receiving a new (or changed) request for a ranging session(s), the rSTA may adjust the list to accommodate the new or changed request based on its granted ranging priority (e.g., relative to the ranging priority of other sessions in the queue). In other words, a new ranging request may be added to the queue in a position determined based on its granted ranging priority, e.g., relative to other requests in the queue. In some embodiments, the queue may have a limited capacity (e.g., so that only a certain number of ranging sessions may be queued at a time, e.g., 10 ranging sessions, among various possibilities) and new or changed ranging session requests may only be added to the queue if they can be accommodated without removing any higher priority ranging session from the queue. The rSTA may also update or modify the queue in response to other information, e.g., in response to knowledge that an iSTA has (or has not) completed a ranging session with another rSTA, in response to changing policies or priorities (e.g., urgent data traffic), or in response to changing network conditions, etc. The rSTA may perform ranging measurements based on the queue, e.g., sequentially.

In some embodiments, the rSTA may schedule its activities (e.g., data traffic and ranging sessions) to accommodate the requested ranging priority of the largest number of ranging sessions possible.

In some embodiments, the rSTA may schedule its activities (e.g., data traffic and ranging sessions) to ensure that all (or as close as possible/practical) high ranging priority ranging sessions are honored at the requested priority. The rSTA may provide service to other functions (e.g., data traffic and/or low ranging priority ranging sessions) only after all high priority ranging sessions are completed. In other words, at least some data traffic may be scheduled (e.g., allocated resources) based on the granted ranging priority.

In some embodiments, the rSTA may schedule its activities so that a ranging session is completed in accordance with the iSTA's priority requirement, e.g., as indicated by ranging priority indication and as permitted by the rSTA's resource allocation policy. For example, a new ranging session request with a 2 s priority (note that other requested priority completion time values are possible) may be scheduled within 2 s. As another example, a new ranging session request with the highest level of time sensitivity requirement may be given the highest priority level in the rSTA's scheduling and resource allocation. An rSTA addressing multiple ranging requests may schedule activities (e.g., including the ranging sessions and/or other activities) to accommodate the requested priorities according to the rSTA's resource allocation policies. However, it should be noted that such scheduling may not guarantee that the requested priorities are achieved, e.g., due to resource limitations such as other traffic on the wireless medium and/or resource allocation policy.

In some embodiments, the rSTA may provide feedback, e.g., to inform the iSTA whether (e.g., and/or how) the rSTA intends to accommodate the iSTA's ranging priority preference. It should be noted that the feedback may only indicate intent to accommodate the ranging priority and thus may not represent a guarantee that the intended priority will actually be achieved (e.g., due the nature of WiFi medium access rules and other factors, an rSTA may not guarantee whether an iSTA's priority can be honored even if the rSTA intends to).

In some embodiments, the feedback may be or include an estimate of the likelihood that rSTA may (e.g., may be able to) accommodate indicated ranging priority. For example, the feedback may include an indication of the level (e.g., high, low, etc.) of confidence that the rSTA will be able to honor the requested priority or the feedback may include an estimated probability (e.g., a percentage likelihood) of honoring the requested priority.

The feedback may be transmitted in any manner, e.g., in any message (e.g., container) or combination of messages. For example, a container of such feedback may be or include either a field, or a subfield of either a frame, an information element (IE), or an information sub-element. The feedback may be transmitted in signaling associated with any layer. For example, the feedback may be transmitted as (e.g., a component of) a media access control (MAC), logical link control (LLC), or physical (PHY) layer message. The feedback may be or comprise a MAC service data unit (MSDU), MAC protocol data unit (MPDU), or an aggregated MPDU or aggregated MSDU. The feedback may be transmitted in any format, e.g., in any number of bits or combination of bit fields. For example, a value of 1 of such a feedback indication may show that the rSTA intends to accommodate the iSTA's priority, while a value of 0 may show that the rSTA does not intend to accommodate the iSTA's priority.

In some embodiments, the feedback may be (or include) a request for additional information, e.g., that the rSTA may use to determine priority. Thus, the prioritization process (404) may include an exchange of any number of messages.

In some embodiments, if an rSTA has indicated that it does not intend to accommodate an iSTA's ranging priority preference (e.g., in response to negative feedback), an iSTA may decide to either continue the ranging session or terminate it, e.g., based on the iSTA's internal policy and/or other factors. An iSTA that terminates a ranging session may choose to restart (e.g., start) a new ranging session (e.g., beginning with ranging negotiations) with the same rSTA(s) or one or more different rSTAs, or may choose to forego the ranging session (e.g., at that time). In other words, an iSTA may determine that an rSTA is not able (or likely) to provide a ranging estimate within the time range that such an estimate would be useful, and may abort the ranging session in response, e.g., the iSTA may withdraw or terminate the ranging measurement request. An iSTA that creates a new ranging session may determine and indicate the same ranging priority for such new ranging sessions, or potentially a different ranging priority.

In response to positive feedback (e.g., an indication that the rSTA intends to provide the requested ranging priority), the iSTA may proceed to perform ranging measurements.

The iSTA and the rSTA may perform ranging (e.g., and/or direction or other spatial) measurement (406), e.g., in accordance with the ranging prioritization determined in 404, e.g., with the granted ranging priority. The iSTA and rSTA may exchange any number of measurement frames and may determine the one way and/or round-trip times (e.g., time of flight) associated with those frames. The iSTA and/or rSTA may calculate the range (e.g., distance) between the devices based on the travel time (one way or round-trip) of the measurement frame(s). For example, range may be calculated based on an average of any number of measured flight times or based on a minimum flight time, among various possibilities. Similarly, a maximum, median, or other percentile (e.g., $30^{th}$ percentile, etc.) of multiple measurements may be used. Still further, a single time estimate may be used.

In some embodiments, the iSTA and/or rSTA may additionally or alternatively calculate the location of the iSTA (e.g., position/direction relative to the rSTA) based on angle of arrival and/or angle of departure estimates as inputs for a location estimate. As with time-based methods, any form of descriptive statistics may be applied to multiple angle measurements (e.g., an average, etc.) or a single angle measurement may be used. The ranging priority techniques described herein may also be applied to such position and/or direction measurements. In some embodiments, a priority may be used for position/direction measurements which may be the same or different from a priority of ranging measurements. The methods of FIG. 4 may apply similarly to such a direction/position (or any other spatial) measurement prioritization scheme. Time- and angle-based methods to estimate location/range may be combined, e.g., by using an angle-based method to calculate direction and a time-based method to estimate distance/range. Priorities for direction measurement and range measurement may be the same or they may be different. Any of various other methods of estimating range and/or location may be used. The TSTA and/or rSTA may use the estimated range and/or location in any way. For example, to determine the approximate location of one or more STAs, to activate a theft deterrent system, etc.

The ranging measurement phase may include any number of range estimates. For example, the ranging measurement phase may result in a single range estimate, or multiple estimates. Multiple estimates may be taken as needed (e.g., until a desired precision is reached). Additionally, or alternatively, multiple estimates may be taken periodically, e.g., once every second, once every 5s, or at any desired period. In some instances, the periodicity also may vary between some estimates.

The ranging priority may be changed during (e.g., and/or between) the ranging measurement sessions. For example, a change in priority may be initiated by the iSTA indicating a changed ranging priority or by the rSTA determining to change its intent to honor the requested ranging priority. The rSTA may change a granted ranging priority for various reasons (e.g., due to factors such as changed ranging priorities of other iSTAs, additional ranging requests, changing data traffic requirements, etc.).

Figure 5:
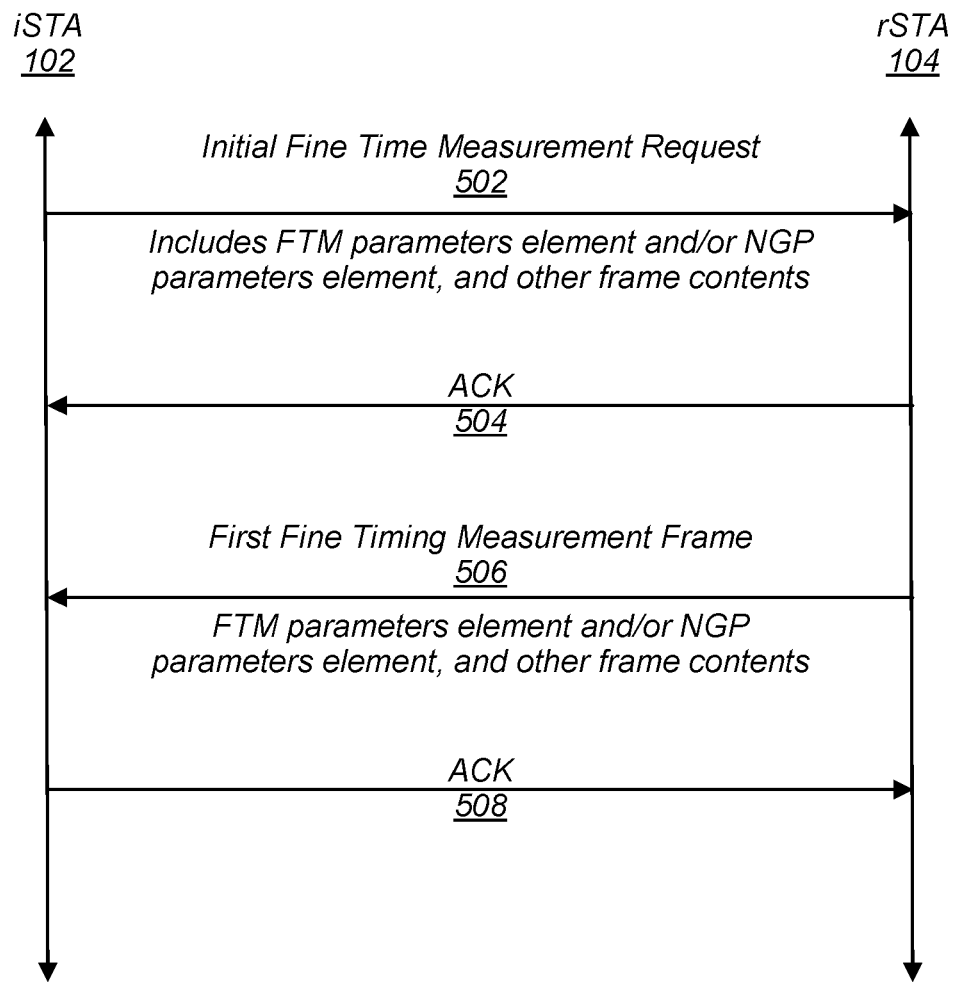
FIG. 5 is a communication flow diagram illustrating an example sequence for a negotiation phase of a ranging session, according to some embodiments.

FIGS. 5-7 and Additional Information

FIGS. 5-7 and the following additional information are provided as being illustrative of further considerations and possible implementation details relating to the method of FIG. 4. FIGS. 5-7 are not intended to be limiting to the disclosure as a whole. Numerous variations and alternatives to the details provided herein below are possible and should be considered within the scope of the disclosure.

FIG. 5 is a communication flow diagram illustrating an exemplary ranging negotiation phase between two devices, e.g., wireless devices 102 and 104. In the illustrated example, wireless device 102 is the iSTA and wireless device 104 is the rSTA.

The iSTA 102 may transmit an initial ranging measurement request to rSTA 104 (502). The request may be a fine timing measurement request, among various possibilities. The request may include any of various parameters such as FTM parameter elements, NGP parameter elements, and/or other contents. For example, the parameters may include bandwidths supported or requested by the iSTA 102 for ranging measurement. The request may include an indication of the ranging priority requested by iSTA 102.

The rSTA 104 may transmit an acknowledgement (ACK) to the iSTA 102 (504). The acknowledgement may be transmitted in any relevant format or resources, e.g., according to 802.11 or other wireless standards. The acknowledgement may be included in a block acknowledgement.

The rSTA 104 may transmit a response to the measurement request (506). The response may be or include an FTM measurement frame. The response may include FTM and/or NGP parameter elements and/or other contents. For example, the response may indicate resources to be used for measurements. The response may be or include feedback about the rSTA 104's intent to accommodate the ranging priority requested by the iSTA 102.

The iSTA 102 may transmit an acknowledgement to the rSTA 104 (508). The acknowledgement may be transmitted in any relevant format or resources, e.g., according to 802.11 or other wireless standards. The acknowledgement may be included in a block acknowledgement.

The iSTA 102 and rSTA 104 may proceed to exchange any number of messages and/or to compute range between the devices.

FIG. 6 is a table illustrating an exemplary ranging priority indication scheme. As shown, there may be 4 ranging priority levels, e.g., which may be indicated in a 2 bit field. The levels may be designated critical (e.g., for the most urgent ranging needs, e.g., related to safety), high (e.g., prior to a loss of battery power), best effort (e.g., for determining range in a commercial outlet, e.g., for indoor navigation), or background (e.g., for routine location logging, e.g., updating a location database).

FIG. 7 is a table illustrating an alternative exemplary ranging priority indication scheme. As shown, there may 2 ranging priority levels, e.g., which may be indicated in a 1 bit field. The levels may be designated critical (e.g., for high time sensitive ranging) or non-critical (e.g., for low time sensitivity ranging).

Note that FIGS. 6 and 7 are illustrative only and that numerous possible ranging priority indication schemes may be used. For example, different numbers of ranging priority levels may be used and/or they may be designated differently.

In the following, exemplary embodiments are provided.

In one set of embodiments an apparatus, comprising a processing element may be configured to cause a first wireless device to: determine a ranging priority; transmit a ranging measurement request to a second wireless device; and transmit a ranging priority indication to the second wireless device, wherein the ranging priority is associated with the ranging measurement request.

In some embodiments, the processing element may be further configured to cause the first wireless device to: receive feedback from the second wireless device, wherein the feedback is in response to the ranging priority indication.

In some embodiments, the processing element may be further configured to cause the first wireless device to: in response to the feedback, terminate the ranging measurement request.

In some embodiments, the ranging priority may be determined based at least in part on one or more applications executing on the first wireless device.

In some embodiments, determining the ranging priority may be further based at least in part on the status of at least one of the one or more applications (e.g., an emergency call) executing on the first wireless device.

In some embodiments, the ranging priority may be determined based at least in part on a battery level of the first wireless device.

In some embodiments, the ranging priority may be determined based at least in part on a location of the first device.

In some embodiments, the processing element may be further configured to cause the first wireless device to: determine a second ranging priority; and transmit a second ranging priority indication to the second wireless device.

In one set of embodiments, a first wireless device, may comprise: an antenna; a radio operably coupled to the antenna; and a processing element operably coupled to the radio; wherein the antenna, radio, and processing element are configured to: determine a ranging priority; transmit a request for a ranging session to a second wireless device; transmit an indication of the ranging priority to the second wireless device, wherein the ranging priority is associated with the ranging session with the second wireless device; and perform the ranging session with the second wireless device.

In some embodiments, the indication of the ranging priority may specify a requested time for completion of the ranging session.

In some embodiments, the indication of the ranging priority may specify a level of priority of the ranging session.

In some embodiments, the indication of the ranging priority may be transmitted with the request for the ranging session.

In some embodiments, the indication may be transmitted in a field or subfield of a frame associated with a wireless local area network.

In some embodiments, the indication may be transmitted in a field or subfield of an information element or an information sub-element associated with a wireless local area network.

In another set of embodiments, an apparatus, may comprise a processing element configured to cause a second wireless device to: receive a ranging measurement request from a first wireless device; receive an indication of a requested ranging priority from the first wireless device; determine a granted ranging priority based at least in part on the requested ranging priority; and perform ranging measurement with the first wireless device according to the granted ranging priority.

In some embodiments, the processing element may be further configured to cause the second wireless device to: maintain a queue of ranging measurement requests; and add the ranging measurement request from the first wireless device to the queue in a position determined based on the granted ranging priority.

In some embodiments, to perform ranging measurement with the first wireless device according to the granted ranging priority, the processing element may be further configured to schedule ranging measurements with the first wireless device based on comparing the granted ranging priority to at least one relative granted ranging priority of at least one other ranging measurement request.

In some embodiments, the processing element may be further configured to cause the second wireless device to: reserve resources for high ranging priority ranging sessions, wherein to perform ranging measurement with the first wireless device according to the granted ranging priority, comprises: in response to determining that the granted ranging priority is a high ranging priority, schedule ranging measurements with the first wireless device on at least a portion of the reserved resources; or in response to determining that the granted ranging priority is not a high ranging priority, schedule ranging measurements with the first wireless device on non-reserved resources.

In some embodiments, the processing element may be further configured to cause the second wireless device to: transmit an indication of the granted ranging priority to the first wireless device.

In some embodiments, the processing element may be further configured to cause the second wireless device to: schedule data traffic based on the granted ranging priority.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A first wireless device, comprising:
a radio; and
a processor operably coupled to the radio;
wherein the processor is configured to cause the first wireless device to:
determine a priority for performing a spatial measurement with respect to a second wireless device, wherein the spatial measurement is one of:
a ranging measurement of a distance to the second wireless device; or
an angle measurement of a direction to the second wireless device; and
transmit an indication of the priority to the second wireless device, wherein the indication of the priority is transmitted prior to performing the spatial measurement.

2. The first wireless device of claim 1, wherein the indication of the priority specifies a requested time for completion of the spatial measurement.

3. The first wireless device of claim 1, wherein the indication of the priority specifies a level of priority of the spatial measurement.

4. The first wireless device of claim 1, wherein the indication of the priority is transmitted in a two bit field of a frame associated with a wireless local area network.

5. The first wireless device of claim 4, wherein a value of the two bit field indicates that the spatial measurement is associated with emergency services.

6. The first wireless device of claim 1, wherein the processor is further configured to cause the first wireless device to receive a response to the indication of the priority, wherein the response indicates one of:
the spatial measurement will be performed at the priority; or
the spatial measurement will not be performed at the priority.

7. An apparatus, comprising:
a processor, configured to cause a first wireless device to:
determine a ranging priority for measuring a distance between the first wireless device and second wireless device;
transmit a ranging measurement request and an indication of the ranging priority; and
subsequently, perform a ranging measurement with the second wireless device.

8. The apparatus of claim 7, wherein the processor is further configured to cause the first wireless device to:
receive a ranging priority response from the second wireless device, wherein the ranging priority response indicates whether the ranging priority will be provided by the second wireless device.

9. The apparatus of claim 8, wherein the processor is further configured to cause the first wireless device to:
in response to the ranging priority response, terminate the ranging measurement request.

10. The apparatus of claim 7, wherein the ranging priority is determined based at least in part on one or more applications executing on the first wireless device.

11. The apparatus of claim 10, wherein determining the ranging priority is further based at least in part on a status of at least one of the one or more applications executing on the first wireless device.

12. The apparatus of claim 7, wherein the ranging priority is determined based at least in part on a battery level of the first wireless device.

13. The apparatus of claim 7, wherein indication of the ranging priority is a two bit field.

14. The apparatus of claim 13, wherein the two bit field is part of a ranging parameters element of an initial fine timing measurement request frame.

15. A second wireless device comprising:
a radio; and
a processor operably coupled to the radio and configured to cause the second wireless device to:
receive a spatial measurement request from a first wireless device;
receive an indication of a requested spatial measurement priority from the first wireless device; and
perform a spatial measurement with the first wireless device based at least in part on the requested spatial measurement priority, wherein the spatial measurement is one of:

a ranging measurement of a distance between the first wireless device and the second wireless device; and an angle measurement of a direction between the first wireless device and the second wireless device.

16. The second wireless device of claim 15, wherein the processor is further configured to cause the second wireless device to:

determine a granted spatial measurement priority based at least in part on the requested spatial measurement priority;

maintain a queue of spatial measurement requests; and add the spatial measurement request from the first wireless device to the queue in a position determined based on the granted spatial measurement priority.

17. The second wireless device of claim 15, wherein to perform the spatial measurement with the first wireless device, the processor is further configured to schedule spatial measurements with the first wireless device based on comparing the requested spatial measurement priority to at least one relative granted spatial measurement priority of at least one other spatial measurement request.

18. The second wireless device of claim 15, wherein the processor is further configured to cause the second wireless device to:

reserve resources for high priority spatial measurement sessions;

determine a granted spatial measurement priority based at least in part on the requested spatial measurement priority; and in response to determining that the granted spatial measurement priority is a high spatial measurement priority, schedule spatial measurements with the first wireless device on at least a portion of the reserved resources.

19. The second wireless device of claim 15, wherein the processor is further configured to cause the second wireless device to:

determine a granted spatial measurement priority based at least in part on the requested spatial measurement priority; and transmit an indication of the granted spatial measurement priority to the first wireless device.

20. The second wireless device of claim 19, wherein the processor is further configured to cause the second wireless device to:

schedule data traffic based on the granted spatial measurement priority.

* * * * *